W. BALZHISER.
COMBINED PROTRACTOR AND LETTERING INSTRUMENT.
APPLICATION FILED NOV. 20, 1917.

1,298,640.

Patented Apr. 1, 1919.
2 SHEETS—SHEET 1.

INVENTOR.
Wm. Balzhiser
BY
Carlos P. Griffin
ATTORNEY.

W. BALZHISER.
COMBINED PROTRACTOR AND LETTERING INSTRUMENT.
APPLICATION FILED NOV. 20, 1917.

Patented Apr. 1, 1919.

INVENTOR.
Wm. Balzhiser.
BY
Carlos P. Griffin
ATTORNEY.

UNITED STATES PATENT OFFICE.

WILLIAM BALZHISER, OF SAN FRANCISCO, CALIFORNIA.

COMBINED PROTRACTOR AND LETTERING INSTRUMENT.

1,298,640.   Specification of Letters Patent.   Patented Apr. 1, 1919.

Application filed November 20, 1917. Serial No. 202,931.

*To all whom it may concern:*

Be it known that I, WILLIAM BALZHISER, a citizen of the United States, residing at San Francisco, in the county of San Francisco, State of California, have invented a new and useful Combined Protractor and Lettering Instrument, of which the following is a specification in such full and clear terms as will enable those skilled in the art to construct and use the same.

This invention relates to a combined protractor and lettering instrument, the object of which is to produce a lettering instrument which will be capable of automatically increasing or diminishing the width of all letters having inclined elements an equal amount, the inclined elements being proportionately changed for different angles of said elements according to the width of the letter desired.

It will be understood by draftsmen skilled in the art that it is sometimes desirable to use a wide flat letter, while at other times it may be desirable to use a comparatively narrow, high letter, or the same letter may be desired to be used of different heights in different parts of the drawing, in which event it is always a matter of some difficulty, and the personal equation of the draftsman, to determine just how wide and what inclination or angle to give the inclined elements of the different letters in order to produce a series of letters which will have the proper widths.

Another object of the invention is to provide a lettering instrument with means whereby it may also be used as a protractor for measuring angles, or for setting of given angles, as may be required.

Other objects of the invention will appear as the description proceeds.

An embodiment of the invention is shown in the drawings in which the same reference numeral is applied to the same portion throughout, but I am aware that there may be modifications thereof.

Fig. 3 is a diagrammatic view indicating the method whereby the several points for determining the slope of the elements of the letters is arrived at.

Figure 1:
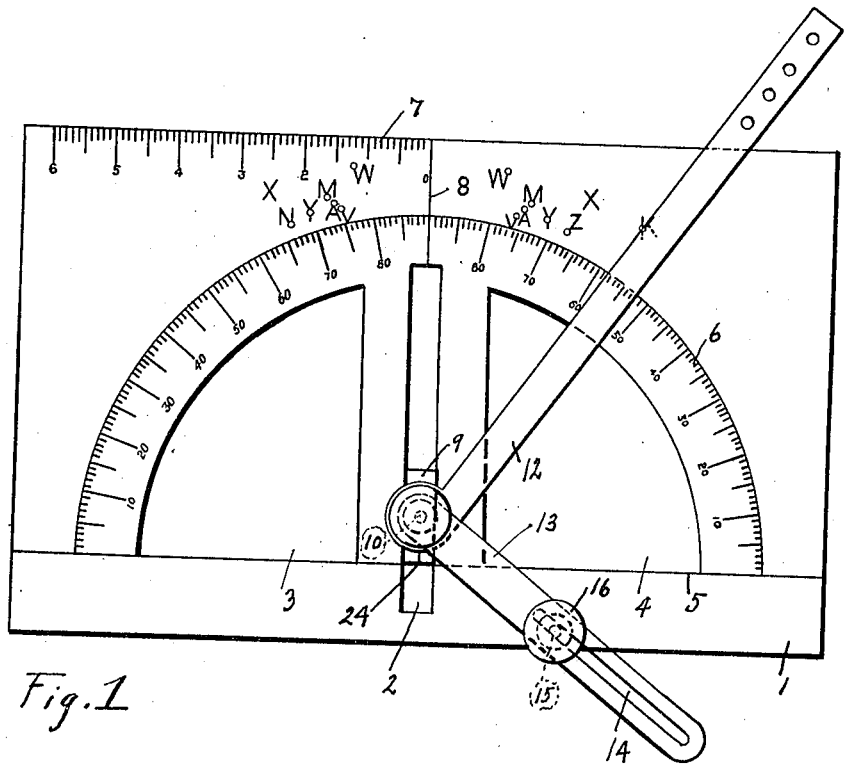
Figure 1 is a plan view of the complete instrument.
Figure 2:
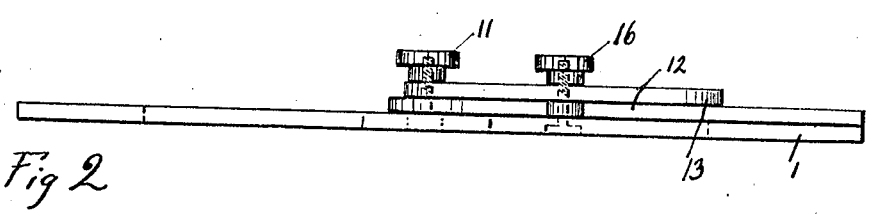
Fig. 2 is a side elevation of the complete instrument.

The numeral 1 indicates a flat sheet of translucent material which has a slot 2 extending therein transversely to its greatest length. Two other openings 3 and 4 are cut in the base 1 in order to provide means whereby the zero base line 5 of the protractor scale may be readily examined. The protractor scale is indicated at 6, and is numbered 0 upwardly to 90 degrees on each side of the center.

At the top of the plate, there is a scale 7 beginning at zero on the center line 8 for the convenience of the user enabling him to set off any desired distances therefrom at will.

Slidable in the slot 2 is a block 9, which has a screw 10 rigidly connected therewith, which screw has a thumb nut 11 on its upper end. The screw 10 passes through the arm 12, and also through the arm 13, which latter arm is slotted at 14, through which passes a screw 15, on the upper end of which is a thumb nut 16. The object of the arm 13 is to permit the block 9 to be locked in any adjustment in the slot 2 in which the latter block is slidable, while at the same time permitting the connection with the arm 12 to be loose enough to allow said arm to move back and forth or to lock it in a given angular adjustment.

On the upper portion of the plate 1, there are a plurality of letters:—"A," "K," "M," "N," "V," "W," "X," "Y" and "Z," which comprise all of the letters ordinarily inclined in draftsmen's lettering systems.

Figure 3:
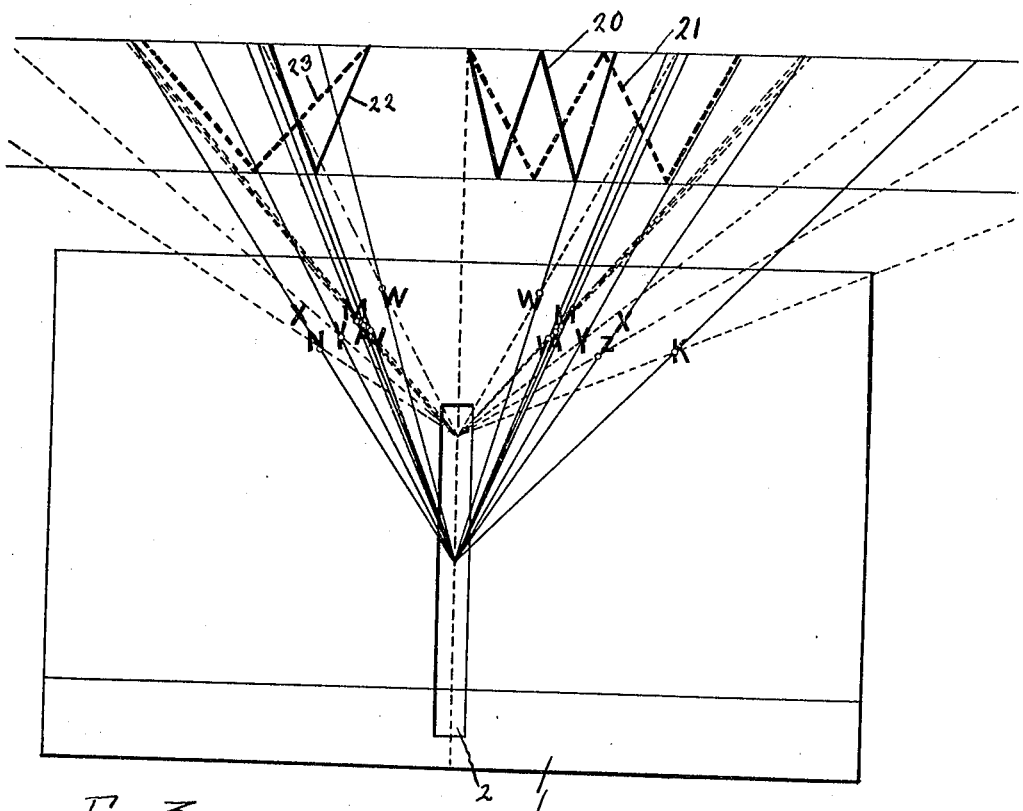

Adjacent each of the letters having similar inclines will be found a small circle or dot, which dot determines the position for the arm 12 to occupy to produce the sloping portion of any one of those letters, for any position of the arm 12 up and down the slot 2. The position of those dots is arrived at as illustrated in Fig. 3, in which will be seen a letter "W" shown in full lines at 20, and a very much wider letter "W" is shown in dotted lines at 21, also a narrower "V" 22 and wider "V" 23.

Now, placing the base 1 in a convenient position with respect to a standard "W" narrow and "V" narrow with its center line in the position indicated and drawing the solid line of the extension of the right side of W narrow and the left side of V narrow. Measure off the same distance from the center line on the left for W which will give the second line of W (from the left) and on the right which will give the right side for V. In like manner the different solid lines are laid off for A, K, M, N, X, Y and Z.

Now, connect the left end of the dotted V (wide) with a new center nearer the letter, and measure off this same distance (left end of dotted V to center) from the center to the right, a dotted line connecting this point with the new center will give the right side of V dotted. Where the respective solid and dotted lines cross on the base 1 gives a point whereby any intermediate position of the center will give a different width for the letter V.

As there are four inclined elements in W and two in V it will be necessary to increase the distance from the center only half as much for each side of W to produce the same total distance. N. Z. X. having only one inclined element to increase the width, will take two times the distance. A. M. will be the same as V.

Y. and K. having two inclined elements, but only extending 2/3 the height of the letters will be 3/2 the same distance as V. All points are thus determined from certain standard letters.

When the apparatus is to be used for the purpose of lettering, the block 9 will be moved to such a height as will give the draftsman a letter of the desired slope, whereupon he may at once determine the slope for all of the letters having sloping elements by simply moving the left hand face of the straight edge 12 until it corresponds with one of the letter dots which the draftsman desires to use.

When the apparatus is to be used as a protractor, the line 5 will be placed adjacent the line from which the desired angle measurement is to be taken, and the graduation 24 on the block 9 will be brought to the center from which the line is to be drawn. When thus brought to the center, the line 5 will thus lie parallel and coincident with one of the lines from which the desired angle is to be made, after which, with the base 1 held firmly in place, the block 9 is moved down until it contacts with the bottom of the slot 2, which will bring the center of the screw 10 to the position occupied by the graduation 24 when crossing the base line 5 extended as illustrated in Fig. 1. The nut 16 is then tightened to hold the screw in that position, and any desired angle may be at once measured or laid off with the arm 12.

The scale on the upper edge of the base 1 is for the purpose of measuring the width, thickness and distance between the letters adjacent given by the instrument, and the zero of its scale is so set that when the radial side of the main arm coincides with it that arm is set at right angles to the base, and said arm is provided with a series of holes therein for the purpose of drawing parallel lines; the angle at which said arm is set determining the distance apart the parallel lines are to be.

It is to be noted that, while the points for the several letters are determined from two letters having considerably different inclinations for their sloping elements, the same points will give any intermediate widths of letters between the extreme narrow and wide letter by placing the block 9 in any intermediate position between the two extreme points as shown on Fig. 3, which while not mathematically exact is sufficiently accurate to produce letters in which the eye cannot discover an error.

Having thus described my invention what I claim as new and desire to secure by Letters Patent of the United States, is as follows, express reservation being made of permissible modifications:

1. A lettering instrument comprising a flat base having a slot extending at right angles to one edge thereof, a block slidable in said slot, a pair of arms pivotally connected with said block, one arm having means for holding the block in a given adjustment in the slot and the other adapted to be used for measuring angles, and means for locking the latter arm in a given position at will.

2. A lettering instrument comprising a flat base having a slot extending at right angles to one edge thereof, a block slidable in said slot, two arms pivotally connected with the block, a fixed screw adapted to secure one of said arms and the block in a given adjustment with respect to the slot, and means to lock the other arm in any angular adjustment with respect to the base edge.

3. A lettering instrument comprising a flat base having a protractor scale and having a slot extending at right angles to one edge thereof, and having a pair of openings therein extending away from a diameter of said protractor scale, a block movable in said slot, two arms pivotally connected to said block, means to secure said arms in a rigid position with respect to the block, and means to secure one of said arms and the block in a rigid position with respect to the base whereby various angles may be measured by moving the other arm, the block being capable of having the center about which both of said arms move brought to the center of the protractor scale on the protractor diameter.

4. A lettering instrument comprising a base having a slot therein, a block movable in said slot, a pair of arms pivotally mounted on said block, means to secure one of said arms and the block in a fixed position with respect to the base, and a series of marks upon which base so positioned as to enable the other arm to be moved from one position to another to produce any one of the inclined elements of a given series of characters.

In testimony whereof I have hereunto set my hand this tenth day of November, A. D. 1917.

WILLIAM BALZHISER.